H. W. ALDEN.
ROLLER BEARING.
APPLICATION FILED APR. 15, 1907.
921,656.
Patented May 18, 1909.
3 SHEETS—SHEET 1.
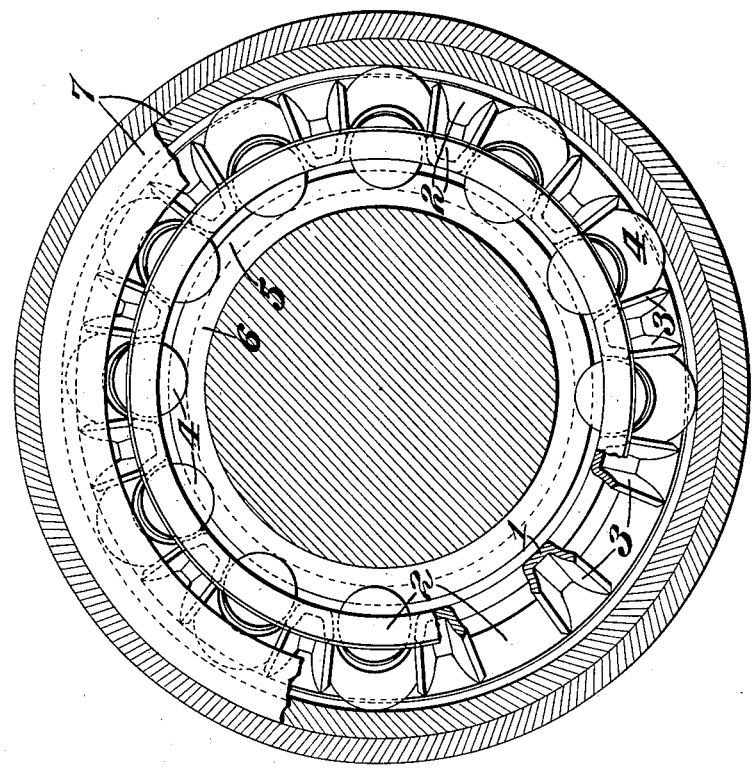
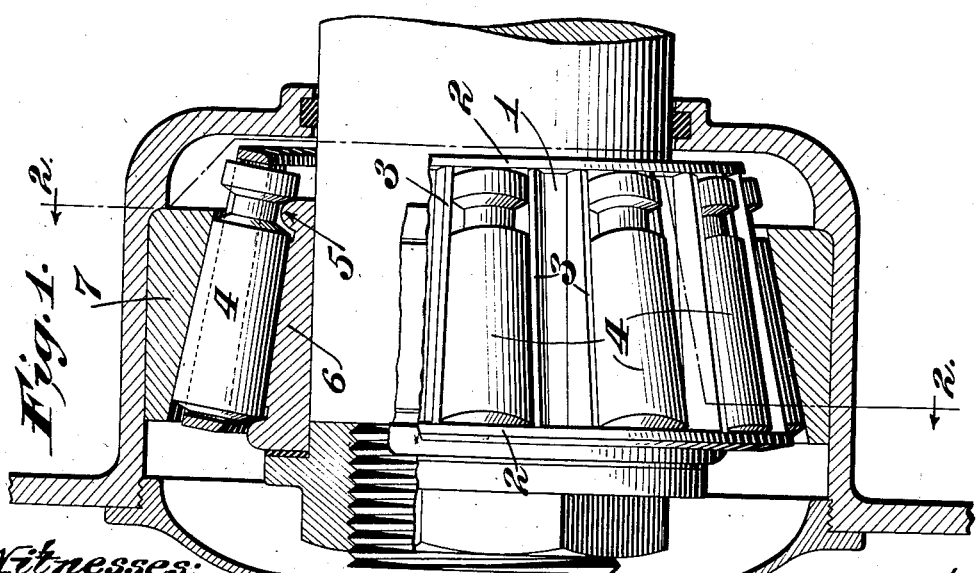

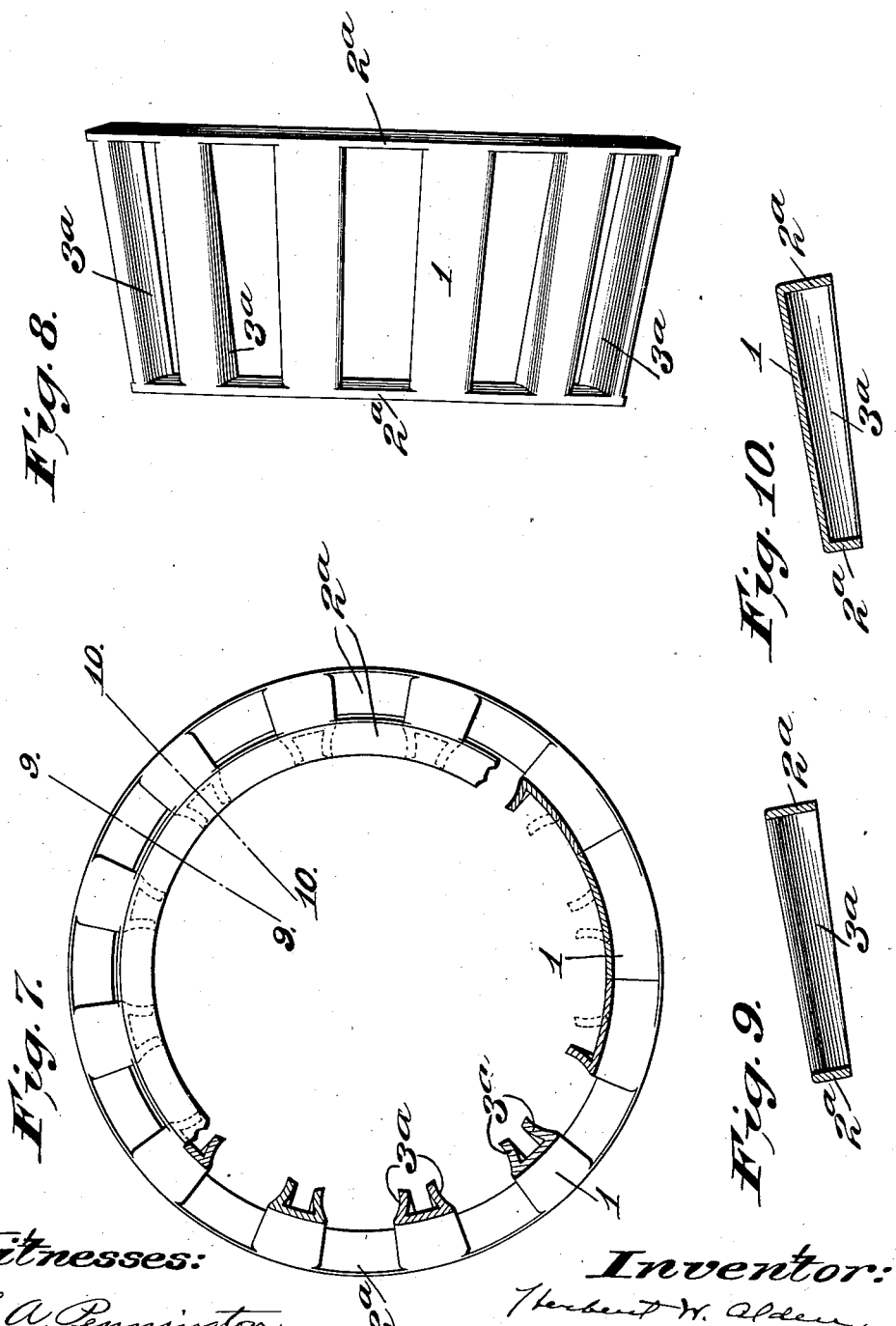

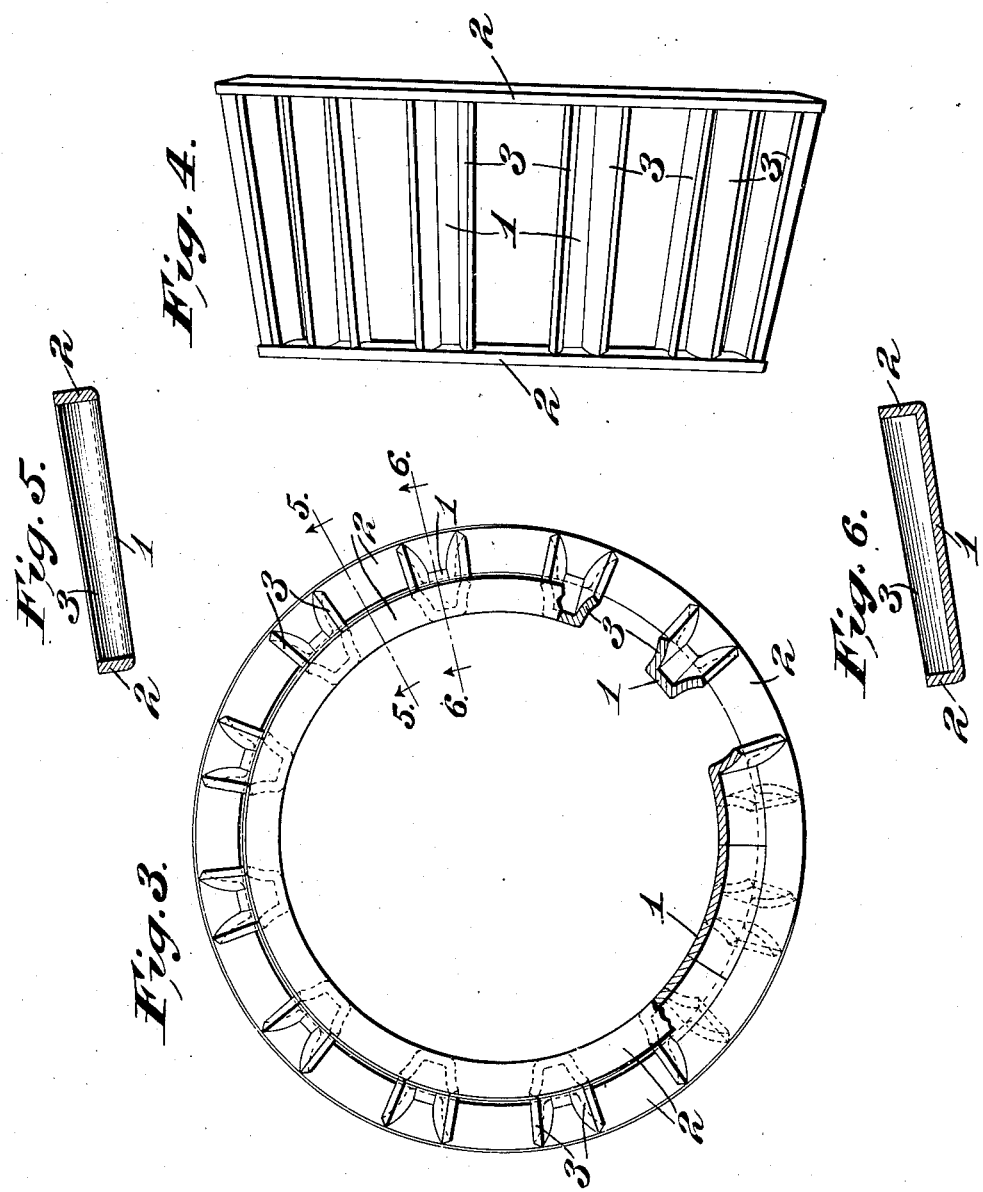

UNITED STATES PATENT OFFICE.

HERBERT W. ALDEN, OF CANTON, OHIO, ASSIGNOR TO TIMKEN ROLLER BEARING AXLE COMPANY, OF CANTON, OHIO, A CORPORATION OF OHIO.

ROLLER-BEARING.

No. 921,656.   Specification of Letters Patent.   Patented May 18, 1909.

Application filed April 15, 1907. Serial No. 368,314.

*To all whom it may concern:*

Be it known that I, HERBERT W. ALDEN, a citizen of the United States, and a resident of Canton, county of Stark, and State of Ohio, have invented a new and useful Improvement in Roller-Bearings, of which the following is a specification.

My invention relates to roller bearings and has for its principal objects to provide a cage of simple and economical construction and of great rigidity.

It consists principally in an integral cage comprising a body portion with suitable pockets formed therein and provided at its ends with annular enlargements.

It also consists in the construction and combination of parts hereinafter described and claimed.

In the accompanying drawing, which forms part of this specification, and wherein like symbols refer to like parts wherever they occur, Figure 1 is a longitudinal section through a roller bearing having the cage applied thereto; Fig. 2 is a transverse section on line 2—2 of Fig. 1; Fig. 3 is an end elevation of the cage, portions being shown in section; Fig. 4 is an edge view of the cage; Fig. 5 is a section on line 5—5 of Fig. 3; Fig. 6 is a section on the line 6—6 of Fig. 3; Fig. 7 is an endwise view partly in elevation and partly sectional of a modified form of cage; Fig. 8 is a side view of said modified form of cage; Figs. 9 and 10 are detail sectional views thereof on the lines 9—9 and 10—10, respectively, of Fig. 7.

As illustrated in the accompanying drawings, my cage comprises a hollow conical body portion or shell 1 having longitudinal pockets formed therein and outwardly extending annular flanges or enlargements 2 at its ends, all made of a single piece of steel. Each pocket is formed by stamping or pressing outwardly the portions of the body on opposite sides of the medial line of the pocket. These are severed from each other longitudinally in the plane of the axis of the cage, and at their ends they are severed from the body portion of the cage in the planes of the inner faces of the end flanges; and thus constitute flaps 3 that are integral with the main body of the cage. The inner surface of each flap of a pair is conical to conform to the roller 4 to be used therein, but the flap has a slightly greater radius of curvature in order to allow a desired clearance. The several pockets are arranged at equidistant intervals and extend from end flange to end flange. Preferably, the body portion of the cage is of such curvature that the axes of the several rollers coincide therewith, and the end flange and the flaps project outwardly less than the outer portions of said rollers.

The cage hereinbefore described is designed to coöperate with rollers of the type illustrated in Fig. 1. In this figure, the rollers are of conical form having a groove near their smaller ends adapted to coöperate with a corresponding rib 5 on an inner bearing piece 6, while their outer bearing piece is a conical shell 7. In assembling the parts of such a roller bearing, the cage is held in a vertical position with its smaller end down. The several rollers are then placed in their respective pockets, and then the inner cone or inner bearing piece is placed between the several rollers thus nested. The metal flaps of the pockets are sufficiently resilient to permit the temporary spreading of the rollers a sufficient distance to let the end rib of the cone move endwise until it snaps into the grooves of the several rollers. When the flaps resume their normal position, the cage keeps them properly assembled on the inner cone and in proper relation thereto, so that the inner cone may be disengaged from the outer bearing surface without affecting the relation of the rollers to said cone.

One of the important advantages of this cage is that it enables the pintles heretofore formed on the ends of the rollers to be dispensed with. Other advantages of my cage are: its simplicity and economy of construction, its rigidity and strength, its slight friction in service, the facility with which the parts of the bearing may be assembled and disassembled, and its capacity for maintaining the proper relation of the rollers to the bearing cone when the outer bearing shell is separated therefrom.

In the modification illustrated in Figs. 7, 8, 9 and 10, the cage comprises a conical body portion or shell 1 and annular flanges 2ª at the ends thereof, the annular flanges being on the inner side of the cage. The cage or shell has longitudinal pockets, but the flaps 3ª at the sides thereof are pressed inwardly instead of outwardly as in the form first described.

What I claim is:

1. An integral pressed steel cage for a roller bearing comprising end flanges and resilient flaps constituting roller pockets, the said flaps being constructed to be moved throughout their entire length relatively to the end flanges.

2. An integral pressed steel cage for a roller bearing comprising a conical shell having annular flanges at its ends and longitudinal flaps extending outwardly in pairs to constitute pockets, the inner surfaces of said flaps being conical.

3. A roller bearing comprising a conical inner bearing piece, a conical outer bearing piece, a series of conical rollers between said bearing pieces, and an integral cage comprising a body portion having longitudinal pockets formed therein for said rollers and annular flanges at the ends of said body portion, the sides of said pockets being adapted to spread apart when the inner bearing piece is forced endwise into position.

4. A roller bearing comprising an integral cage having longitudinal pockets formed therein, rollers seated in said pockets, and a conical inner bearing piece, the sides of said pockets being adapted to permit the rollers to spread apart when the inner bearing piece is forced endwise into position.

5. A roller bearing cage comprising a single piece of steel having outwardly extending annular flanges at its ends and pockets in the body portion of the cage, said flaps extending longitudinally in the plane of the axis of the cage and free at their ends from the body portion of the cage in the plane of the inner faces of the end flanges to form resilient pockets for rollers.

6. A roller bearing cage comprising a single piece of metal provided with end flanges and resilient flaps extending between said end flanges and constructed to be deflected throughout their entire length relatively to the end flanges.

7. A roller bearing cage formed from a single piece of metal comprising end flanges, and resilient flaps constituting roller pockets between said flanges, the flaps being free from the body of the cage at their ends whereby they may move relatively to the end flanges.

8. A roller bearing cage formed from a single piece of metal comprising end flanges and resilient flaps constituting roller pockets opening toward the axis of the cage for the insertion of rollers, the flaps being free at their ends, whereby they may move relatively to the end flanges.

9. A roller bearing cage formed from a single piece of metal and comprising end flanges and roller pockets with resilient sides, the sides of said pockets constructed to move relatively to the end pieces.

10. An integral cage for a roller bearing comprising a body portion having longitudinal pockets formed therein with resilient side flaps, and annular flanges, said flaps constructed to move relatively to the flanges.

11. A roller bearing comprising a conical inner bearing piece having a rib near the smaller end thereof, a conical outer bearing piece, a series of conical rollers between said bearing pieces, each of said rollers having a groove to coöperate with said rib, and an integral cage for said rollers, said cage comprising a conical body portion having longitudinal pockets for said rollers and annular flanges at the ends thereof, the portions of the cage constituting the pockets being resilient flaps adapted to spread apart to permit the inner bearing piece to be forced endwise into position.

12. A roller bearing comprising a conical inner bearing piece having a rib near the smaller end thereof, a conical outer bearing piece, a series of conical rollers between said bearing pieces, each of said rollers having a groove to coöperate with said rib, and a cage for said rollers, said cage comprising a conical body portion having longitudinal pockets for said rollers and annular flanges at the ends thereof, the portions of the cage constituting the pockets being resilient flaps adapted to be spread apart to permit the inner bearing piece to be forced endwise into position.

In testimony whereof I have signed my name to this specification in the presence of two subscribing witnesses this 8th day of April, 1907, at Canton, Stark county, Ohio.

HERBERT W. ALDEN.

Witnesses:
J. W. WHITING, JR.,
M. J. HOGAN.